United States Patent
Katagiyama et al.

(10) Patent No.: US 8,047,725 B2
(45) Date of Patent: Nov. 1, 2011

(54) ASSEMBLY-TYPE DURABLE OPTICAL CONNECTOR ADAPTER

(75) Inventors: Naoki Katagiyama, Tokyo (JP); Yuichi Koreeda, Tokyo (JP); Hikaru Kouta, Tokyo (JP); Hisaya Takahashi, Tokyo (JP); Mikio Oda, Tokyo (JP); Hideyuki Ono, Tokyo (JP)

(73) Assignees: Japan Aviation Electronics Industry, Limited, Tokyo (JP); NEC Corporation, Tokyo (JP)

( * ) Notice: Subject to any disclaimer, the term of this patent is extended or adjusted under 35 U.S.C. 154(b) by 224 days.

(21) Appl. No.: 12/459,647

(22) Filed: Jul. 6, 2009

(65) Prior Publication Data

US 2010/0002999 A1   Jan. 7, 2010

(30) Foreign Application Priority Data

Jul. 7, 2008   (JP) ................ 2008-177053

(51) Int. Cl.
*G02B 6/38* (2006.01)
(52) U.S. Cl. ............... 385/58; 385/53; 385/55; 385/56; 385/70; 385/75
(58) Field of Classification Search .............. 385/58, 385/70, 75
See application file for complete search history.

(56) References Cited

U.S. PATENT DOCUMENTS

| | | | | |
|---|---|---|---|---|
| 5,274,729 A * | 12/1993 | King et al. | ..... | 385/134 |
| 6,283,640 B1 * | 9/2001 | Stephenson et al. | ..... | 385/58 |
| 2003/0169975 A1 * | 9/2003 | Anderson et al. | ..... | 385/76 |
| 2007/0201798 A1 * | 8/2007 | Kramer et al. | ..... | 385/75 |
| 2008/0112672 A1 * | 5/2008 | Lewallen et al. | ..... | 385/58 |

FOREIGN PATENT DOCUMENTS

| | | |
|---|---|---|
| JP | 6-082655 | 3/1994 |
| JP | 2003-270488 | 9/2003 |
| JP | 2005-115005 | 4/2005 |
| JP | 2006-259220 | 9/2006 |

OTHER PUBLICATIONS

Japanese Office Action dated Jun. 16, 2010.

* cited by examiner

*Primary Examiner* — Ryan Lepisto
(74) *Attorney, Agent, or Firm* — Collard & Roe, P.C.

(57) ABSTRACT

In an optical connector adapter for use in connecting a first and a second optical connector plug to each other, a second adapter half is butted against a first adapter half in a predetermined direction. The first and second adapter halves have engaging means for maintaining the first and second adapter halves in a butted state in the predetermined direction. The engaging means is configured to be disposed inside the optical connector adapter and to be prevented from releasing engagement thereof by at least one of the first and second optical connector plugs.

7 Claims, 7 Drawing Sheets

ASSEMBLY-TYPE DURABLE OPTICAL CONNECTOR ADAPTER

This application is based upon and claims the benefit of priority from Japanese patent application No. 2008-177053, filed on Jul. 7, 2008, the disclosure of which is incorporated herein in its entirely by reference.

TECHNICAL FIELD

This invention relates to an optical connector adapter for use in connecting optical connector plugs to each other.

BACKGROUND ART

Several examples of this type of adapter are disclosed in Japanese Unexamined Patent Application Publication (JP-A) No. H06-82655. Each of those adapters comprises two adapter elements butted and coupled together and thus the number of components can be made small. The coupling between the adapter elements is performed by engaging means exposed on the outer surfaces of the adapter elements. The engaging means comprises a thin-plate elastic locking piece extending from the outer surface of each adapter element toward the mating adapter element and a recess formed on the outer surface of each adapter element. When the adapter elements are butted against each other, the elastic locking pieces are snap-engaged into the recesses, respectively, so that the adapter elements are coupled together. Thus, the assembly is easy.

SUMMARY OF THE INVENTION

However, in each of the adapters disclosed in Japanese Unexamined Patent Application Publication (JP-A) No. H06-82655, since the thin-plate elastic locking pieces are exposed on the outer surfaces of the adapter elements and thus are not protected, there is a possibility that the elastic locking pieces may be subjected to damage such as plastic deformation or breakage during transfer of the adapter elements or in an adapter assembly process. Further, even after the adapter elements are coupled together, there is a possibility that the engaging means between the adapter elements may malfunction, for example, upon receiving an impact from the outside.

It is therefore an exemplary object of the present invention to provide an optical connector adapter having a small number of components, easy to assemble, and still durable.

According to an exemplary aspect of the present invention, there is provided an optical connector adapter for use in connecting a first and a second optical connector plug to each other, comprising a first adapter half and a second adapter half which is butted against the first adapter half in a predetermined direction, wherein the first and second adapter halves have engaging means for maintaining the first and second adapter halves in a butted state thereof in the predetermined direction, and the engaging means is configured to be disposed inside the optical connector adapter and to be prevented from releasing engagement thereof by at least one of the first and second optical connector plugs.

DESCRIPTION OF THE EXEMPLARY EMBODIMENT

Figure 1:
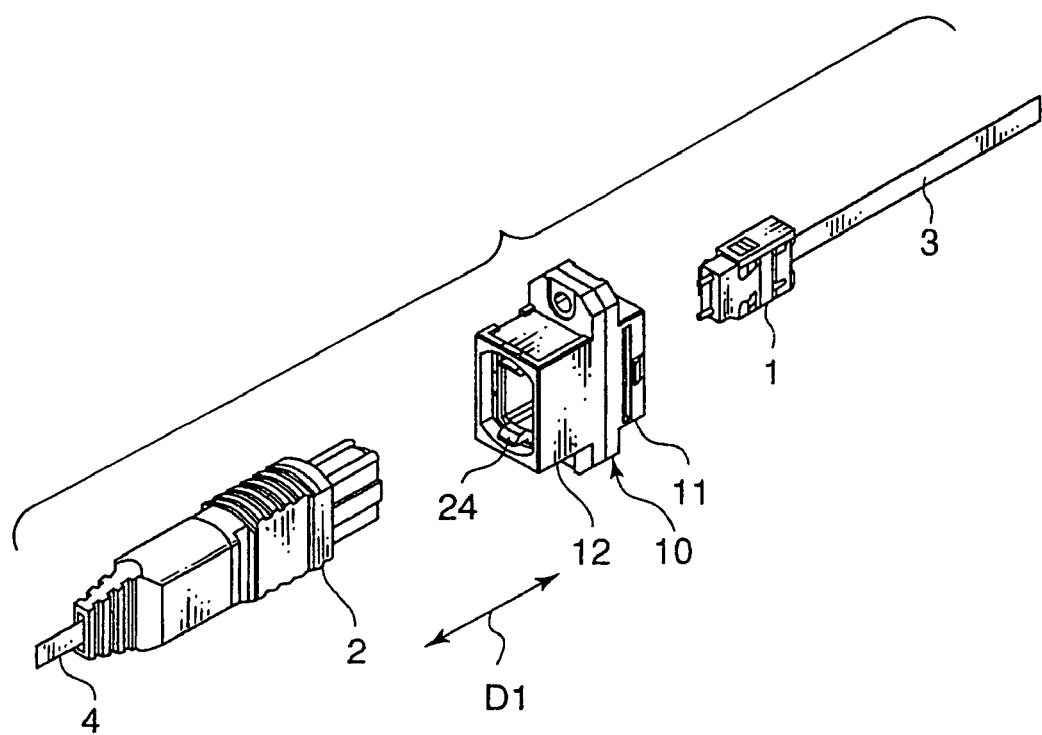
FIG. 1 is a perspective view illustrating an optical connector adapter according to an exemplary embodiment of the present invention, along with a first and a second optical connector plug in a non-connected state.
Figure 2:
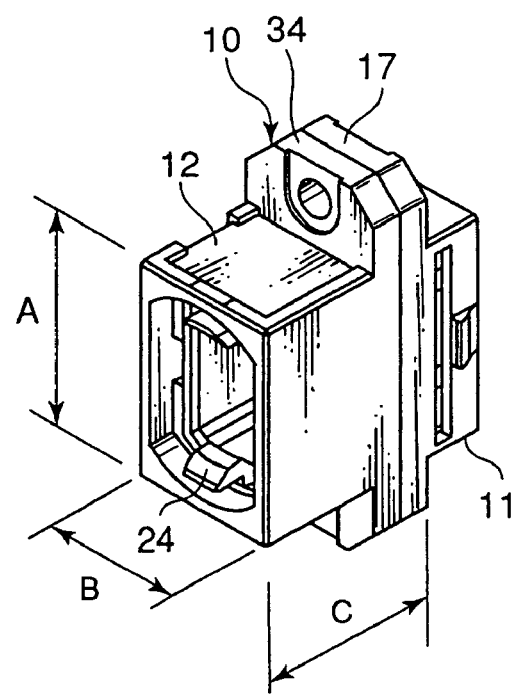
FIG. 2 is an enlarged perspective view of the optical connector adapter illustrated in FIG. 1.

Referring to FIGS. 1 and 2, description will be given of an optical connector adapter according to an exemplary embodiment of the present invention.

The optical connector adapter, generally designated by reference numeral 10, is used for connecting a first optical connector plug 1 and a second optical connector plug 2 to each other in a predetermined direction D1 and designed to have external dimensions A, B, and C equal to those of an F13-type optical fiber connector adapter according to JIS-C-5982.

The first optical connector plug 1 is fixedly connected to one end of an optical fiber 3 and may be called an optical fiber connector. The second optical connector plug 2 is fixedly connected to one end of an optical fiber 4 and is herein an optical fiber connector according to JIS-C-5982.

The optical connector adapter 10 comprises a first adapter half 11 and a second adapter half 12 butted against the first adapter half 11 in the predetermined direction D1. The first and second adapter halves 11 and 12 are each a component integrally formed of plastic. Therefore, the optical connector adapter 10 is composed of the two components and thus has an advantage in that the number of components is small.

Figure 3:
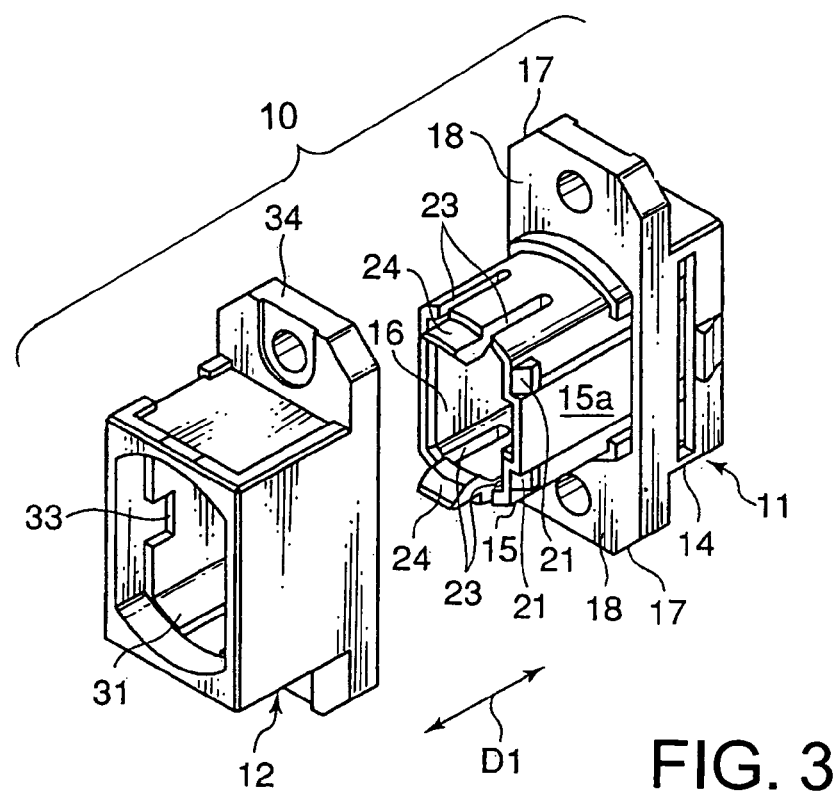
FIG. 3 is an exploded perspective view, seen from one side, of the optical connector adapter of FIG. 2.
Figure 4:
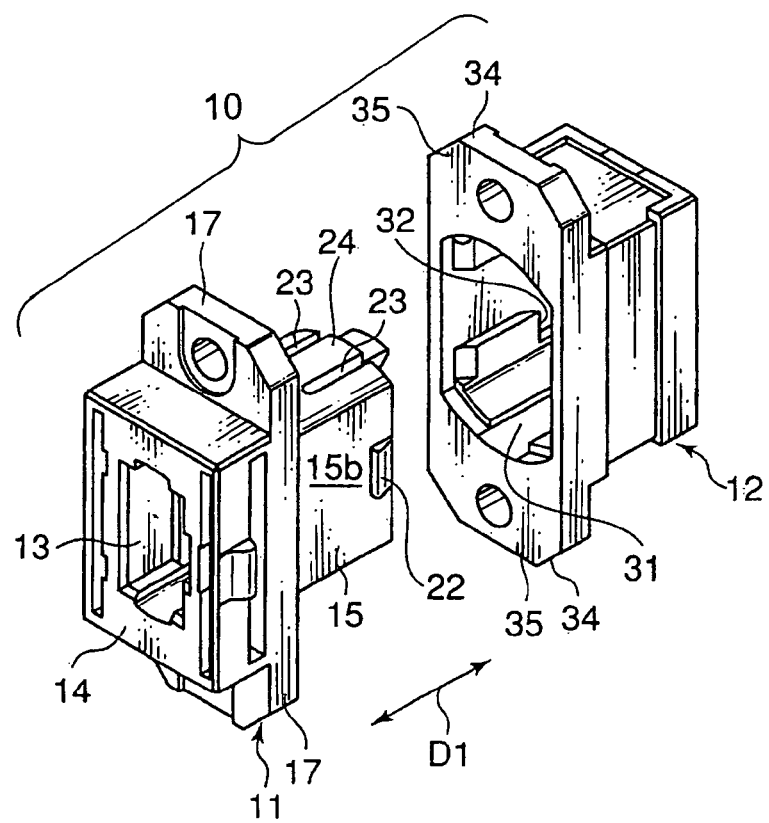
FIG. 4 is an exploded perspective view, seen from a side opposite to that of FIG. 3, of the optical connector adapter of FIG. 2.

Referring also to FIGS. 3 and 4, the description of the optical connector adapter 10 will be continued.

The first adapter half 11 comprises a body portion 14 defining a first fitting hole 13 for receiving the first optical connector plug 1, and a tubular portion 15 projecting from the body portion 14 on one side in the predetermined direction D1. The tubular portion 15 defines a second fitting hole 16 for receiving the second optical connector plug 2. The first fitting hole 13 and the second fitting hole 16 communicate with each other inside the first adapter half 11 in the predetermined direction D1.

A pair of mounting flanges 17 extending upward and downward, respectively, are formed at a portion, adjacent to the tubular portion 15, of the body portion 14. Surfaces, on the tubular portion 15 side, of the mounting flanges 17 serve as butting end faces 18 that are butted against the second adapter half 12.

On the outer surface of the tubular portion 15, engaging portions 21 and 22 each in the form of a convex portion are formed at three positions adjacent to the forward end of the tubular portion 15 so as to be spaced apart from each other in the circumferential direction. Specifically, two engaging portions 21 are formed on the outer surface of a right-side wall portion 15a of the tubular portion 15 and one engaging portion 22 is formed on the outer surface of a left-side wall portion 15b of the tubular portion 15. The right-side wall portion 15a and the left-side wall portion 15b have different shapes and the right-side wall portion 15a has a bulging portion.

Further, the tubular portion 15 has an upper wall portion and a lower wall portion each formed with a pair of cut grooves 23 extending in the predetermined direction D1. Each of the cut grooves 23 extends from the forward end of the tubular portion 15 toward the body portion 14. Between each pair of cut grooves 23 is formed a cantilever locking piece 24 constituting a part of the tubular portion 15. The cut grooves 23 serve not only to form the locking pieces 24, but also to easily enable elastic deformation of the right-side and left-side wall portions 15a and 15b of the tubular portion 15 as will be described later.

On the other hand, the second adapter half 12 defines a mounting hole 31 penetrating in the predetermined direction D1 and adapted to receive the tubular portion 15. On the inner surface of the mounting hole 31, engaging portions 32 and 33 each in the form of a concave portion are formed at three positions that correspond one-to-one with the engaging portions 21 and 22 of the tubular portion 15 when the tubular portion 15 is received therein.

Further, the second adapter half 12 has mounting flanges 34 that are butted against the mounting flanges 17 of the first adapter half 11 in the predetermined direction D1. Surfaces, that are butted against the mounting flanges 17 of the first adapter half 11, of the mounting flanges 34 of the second adapter half 12 serve as butting end faces 35.

Figure 5A:
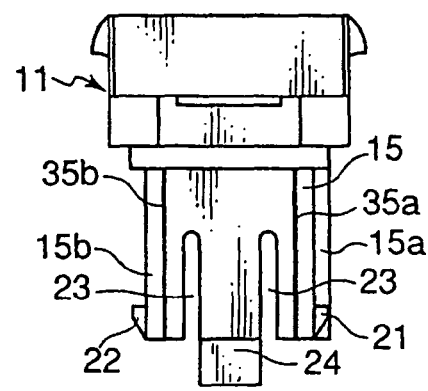
FIG. 5A is an explanatory view of a first adapter half included in the optical connector adapter of FIG. 2.
Figure 5B:
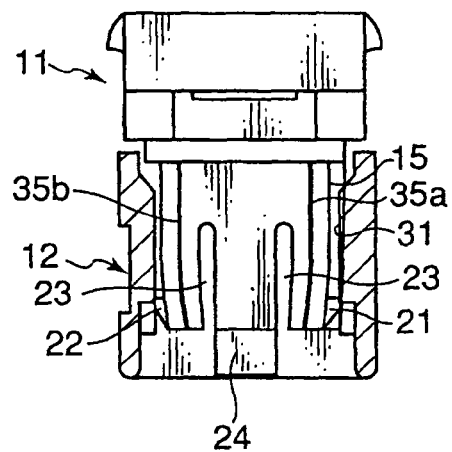
FIG. 5B is an explanatory view for explaining a state where a second adapter half included in the optical connector adapter of FIG. 2 and the first adapter half of FIG. 5A are being assembled together, wherein only the second adapter half is shown in cross-section.
Figure 5C:
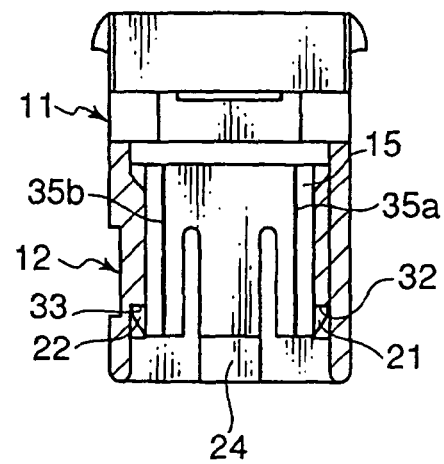
FIG. 5C is an explanatory view for explaining a state where the first and second adapter halves of FIG. 5B have been assembled together, wherein only the second adapter half is shown in cross-section.

Referring now to FIGS. 5A to 5C, a description will be given of the operation when the first adapter half 11 and the second adapter half 12 are butted against each other.

First, when the first adapter half 11 is alone as shown in FIG. 5A, center lines 35a and 35b of the right-side and left-side wall portions 15a and 15b, respectively, of the tubular portion 15 show parallel straight lines.

When the tubular portion 15 of the first adapter half 11 is inserted into the mounting hole 31 of the second adapter half 12 as shown in FIG. 5B, the engaging portions 21 and 22 of the tubular portion 15 are pushed by the inner surface of the mounting hole 31 so that the right-side wall portion 15a and the left-side wall portion 15b are elastically deformed inward by narrowing the cut grooves 23. Therefore, the operation of inserting the tubular portion 15 into the mounting hole 31 is easy. That is, when engaging the first adapter half 11 and the second adapter half 12 with each other, there is no need for a costly jig or apparatus, engaging components, or the like. Further, since the number of assembly steps can be made small, the components can be engaged together in a short time.

When the first adapter half 11 is butted against the second adapter half 12 as shown in FIG. 5C, the engaging portions 21 and 22 of the tubular portion 15 are engaged into the engaging portions 32 and 33 on the inner surface of the mounting hole 31, respectively, to thereby restore the right-side wall portion 15a and the left-side wall portion 15b and thus the center lines 35a and 35b return to the parallel straight lines. Therefore, by the engagement between the engaging portions 21 and 22 and the engaging portions 32 and 33, the first adapter half 11 and the second adapter half 12 are fixed to each other in the butted state.

That is, when the first adapter half 11 is butted against the second adapter half 12 in the state where the tubular portion 15 is inserted into the mounting hole 31, the engaging portions 21 and 22 are engaged with the engaging portions 32 and 33 in the predetermined direction D1 so that the first adapter half 11 and the second adapter half 12 are coupled together. Therefore, the operation of assembling the optical connector adapter 10 from the first adapter half 11 and the second adapter half 12 is easy. In this case, the engaging portions 21 and 22 and the engaging portions 32 and 33 cooperatively constitute engaging means for maintaining the first adapter half 11 and the second adapter half 12 in the butted state.

Referring back to FIGS. 1 to 4, a description will be given of an operation of connecting the first optical connector plug 1 and the second optical connector plug 2 to the optical connector adapter 10.

The first optical connector plug 1 and the second optical connector plug 2 are respectively fitted into the first fitting hole 13 and the second fitting hole 16 of the optical connector adapter 10 from both sides in the predetermined direction D1. Then, the first and second optical connector plugs 1 and 2 face each other inside the optical connector adapter 10 so that the optical fibers 3 and 4 are optically connected to each other. In this state, the locking pieces 24 are engaged with the second optical connector plug 2 in the predetermined direction D1 to thereby prevent the second optical connector plug 2 from coming off the optical connector adapter 10. Although not illustrated, the first optical connector plug 1 is, of course, also prevented from coming off the optical connector adapter 10.

Further, when the second optical connector plug 2 is fitted into the second fitting hole 16, the right-side and left-side wall portions 15a and 15b of the tubular portion 15 are prevented from being deformed inward and thus the possibility is small that the engagement between the engaging portions 21 and 22 and the engaging portions 32 and 33 is released. That is, the engaging means described above is prevented from releasing the engagement between the components by the second optical connector plug 2. Therefore, not only damage to the engaging means is prevented, but also malfunction of the engaging means is prevented. That is, since the engaging means is not exposed on the outer surface even after the engagement, even if an impact is received from the outside, the impact is not directly applied to the engaging means and, therefore, it is possible to maintain the firm engagement between the components by the engaging means.

Figure 6:
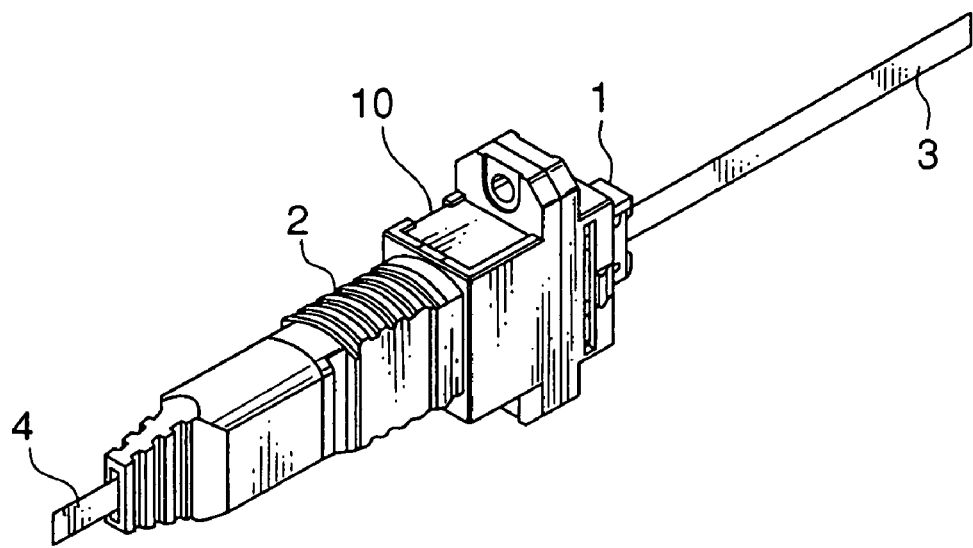
FIG. 6 is a perspective view illustrating one example of a using state of the optical connector adapter of FIG. 1, along with the first and second optical connector plugs.

FIG. 6 shows one example of a using state where the first optical connector plug 1 and the second optical connector plug 2 are connected to the optical connector adapter 10.

Figure 7:
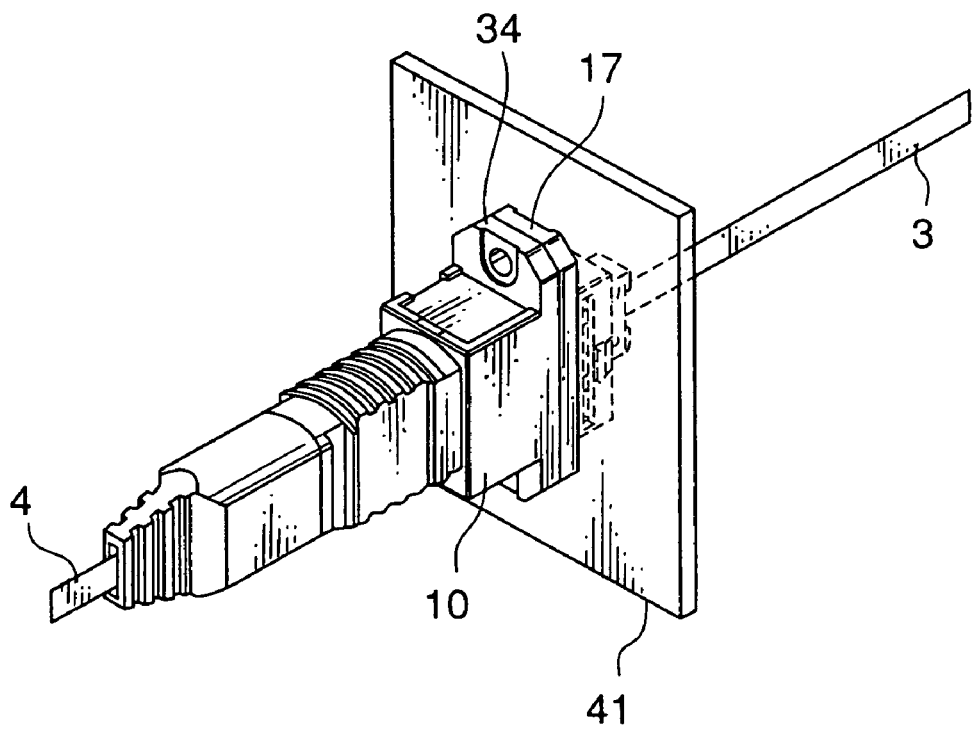
FIG. 7 is a perspective view illustrating another example of a using state of the optical connector adapter of FIG. 1, along with the first and second optical connector plugs.
Figure 8:
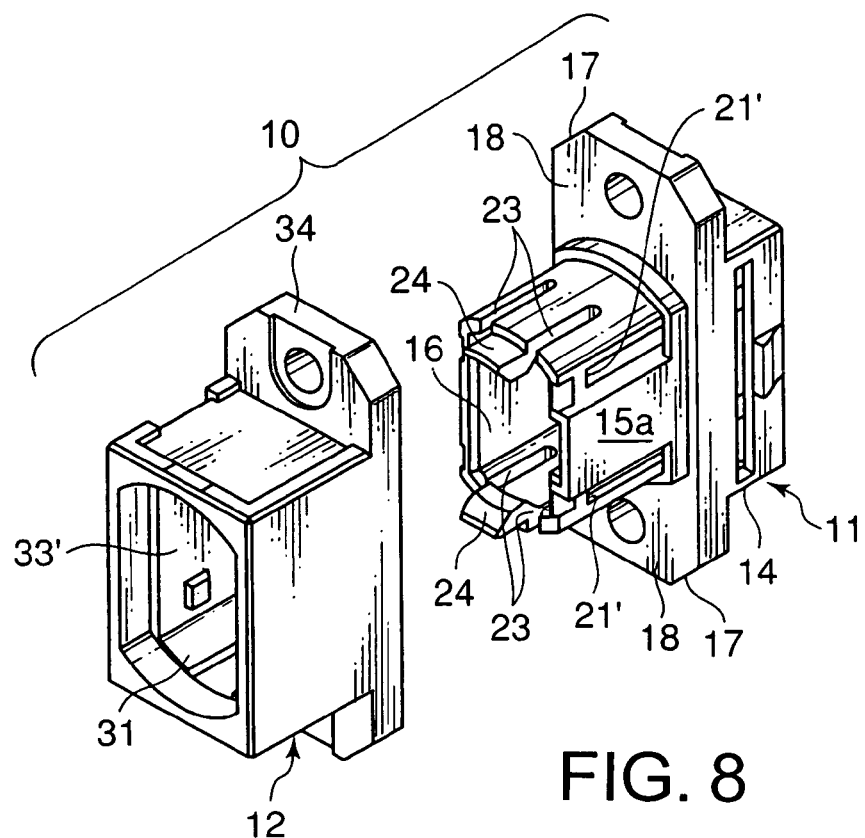
FIG. 8 is an exploded perspective view, seen from one side, of an optical connector adapter according to a modification of the present invention.
Figure 9:
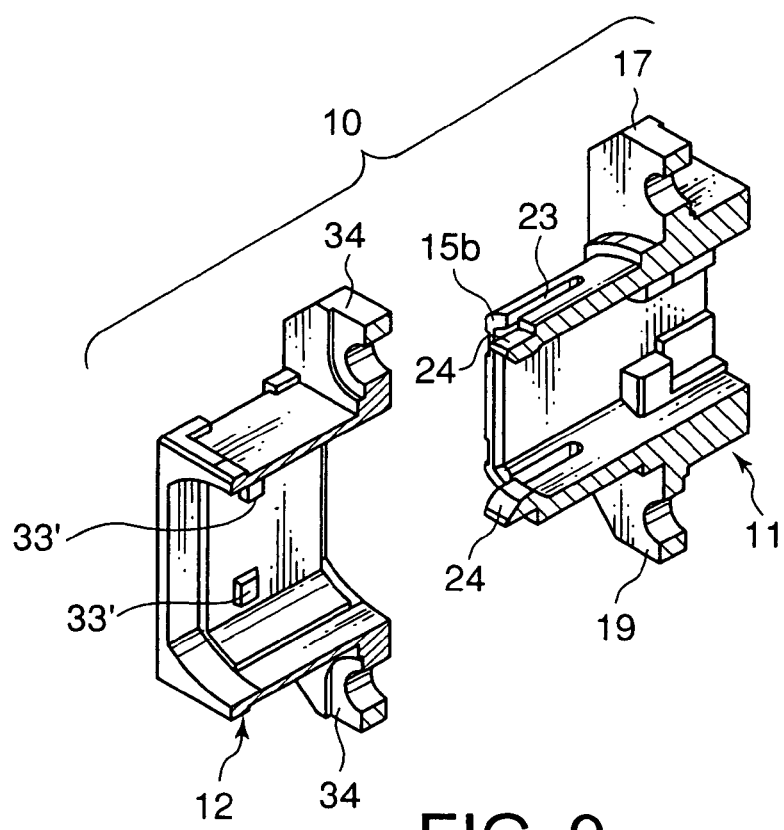
FIG. 9 is a sectional perspective view, taken along the central axis and seen from the same side as that of FIG. 8, of the optical connector adapter in the state of FIG. 8.
Figure 10:
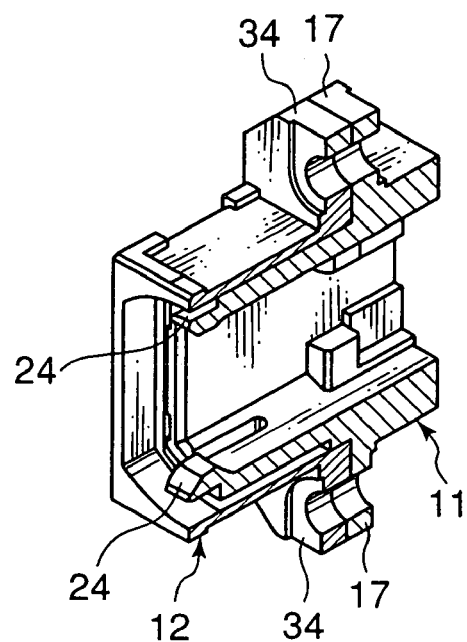
FIG. 10 is a sectional perspective view, taken along the central axis and seen from the same side as that of FIG. 8, of the optical connector adapter of FIG. 8 in a state after assembly thereof.
Figure 11:
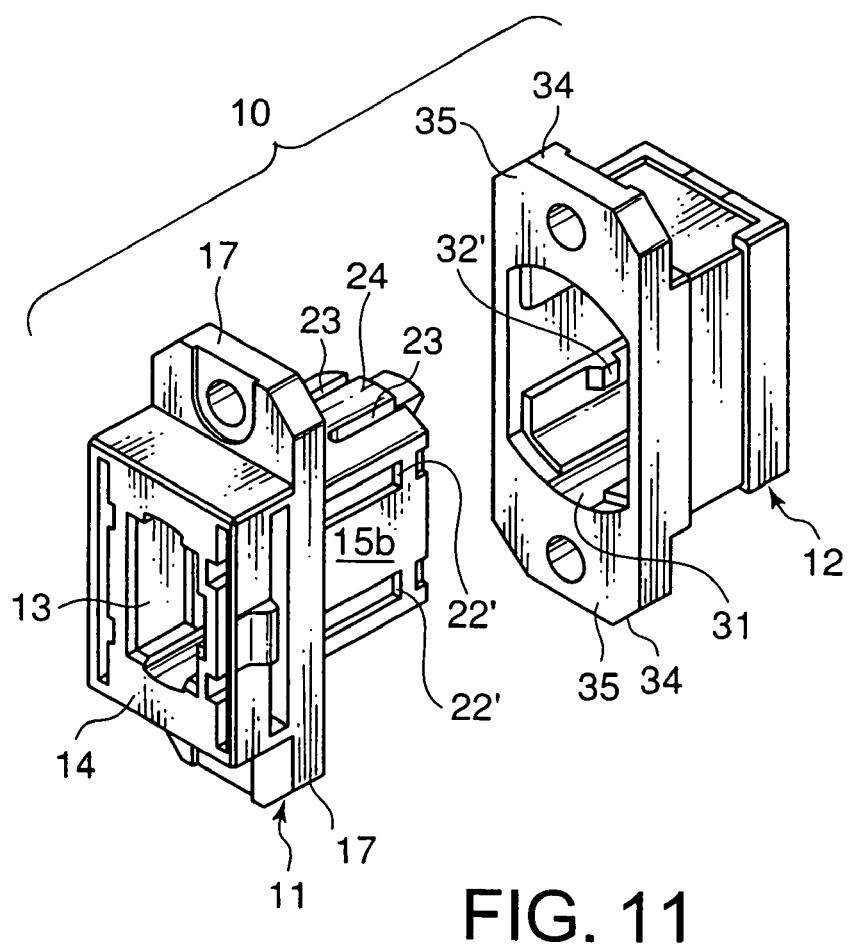
FIG. 11 is an exploded perspective view, seen from a side opposite to that of FIG. 8, of the optical connector adapter of FIG. 8.
Figure 12:
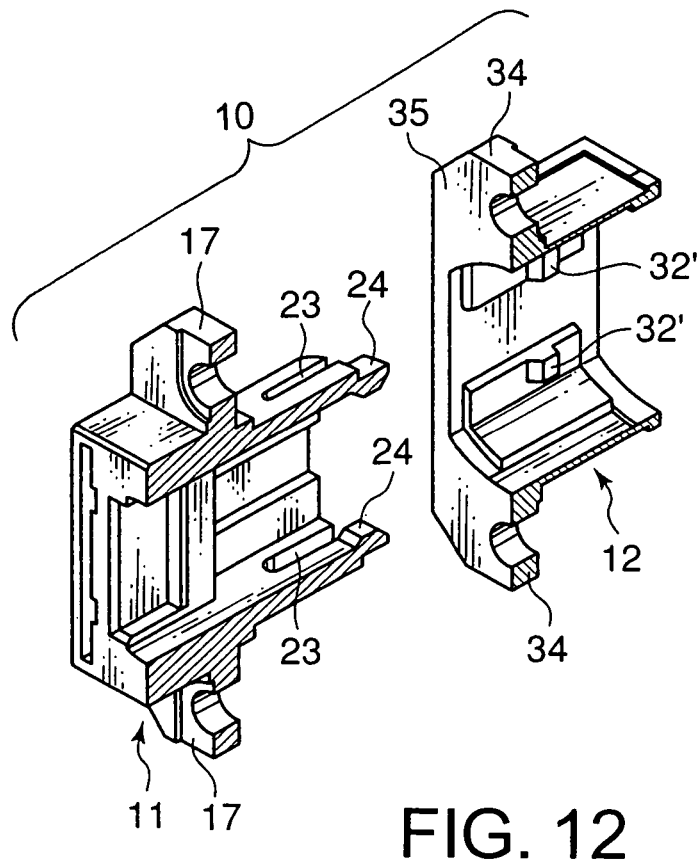
FIG. 12 is a sectional perspective view, taken along the central axis and seen from the same side as that of FIG. 11, of the optical connector adapter in the state of FIG. 11.
Figure 13:
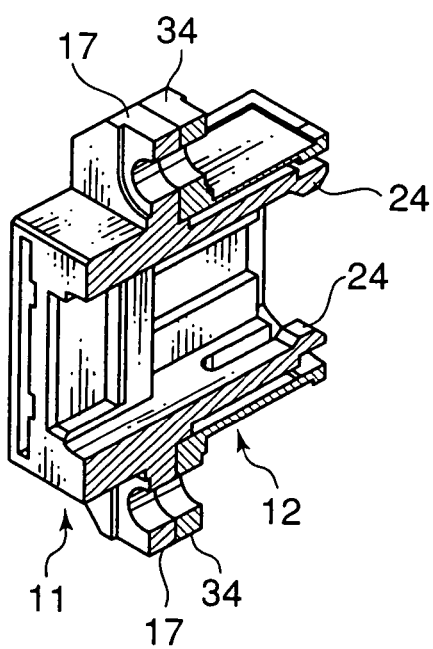
FIG. 13 is a sectional perspective view, taken along the central axis and seen from the same side as that of FIG. 11, of the optical connector adapter of FIG. 8 in the state after the assembly thereof.

FIG. 7 shows, as another example of a using state, a configuration in which the optical connector adapter 10 is attached to a panel 41 of a housing. In the latter case, the optical connector adapter 10 can be fixed to the panel 41 of the housing by the use of the mounting flanges 17 and 34.

According to the optical connector adapter 10 described above, the number of components is small, the assembly is easy, and further, damage or malfunction of the engaging means can be prevented. Further, when the second optical connector plug 2 is inserted into the second fitting hole 16 of the optical connector adapter 10, the second optical connector plug 2 serves to prevent inward deformation of the right-side and left-side wall portions 15a and 15b of the tubular portion 15 and, therefore, the engagement between the engaging portions 21 and 22 and the engaging portions 32 and 33 is prevented from being released and thus the first adapter half 11 and the second adapter half 12 are firmly coupled together.

Referring to FIGS. 8 to 13, a modification of the optical connector adapter 10 will be described. The same reference symbols are assigned to portions of the modification having the same functions as those of the optical connector adapter described with reference to FIGS. 1 to 5, thereby omitting description thereof.

In this modification, there are provided two engaging portions 21' on the outer surface of a right-side wall portion 15a of a tubular portion 15 and two engaging portions 22' on the outer surface of a left-side wall portion 15b of the tubular portion 15, i.e. the four engaging portions 21' and 22' in total. These engaging portions 21' and 22' are each in the form of a concave portion. On the other hand, on the inner surface of a mounting hole 31, engaging portions 32' and 33' adapted to engage with the engaging portions 21' and 22' in the predetermined direction D1 are formed at four positions that correspond one-to-one with the engaging portions 21' and 22' of the tubular portion 15 when the tubular portion 15 is received therein. The engaging portions 32' and 33' are each in the form of a convex portion.

In this manner, it is possible to optionally change the number of engaging portions 21' and 22' and engaging portions 32' and 33' and, further, various combinations can be employed for the shapes thereof wherein when one of them is a convex portion, the other is a concave portion.

The description has been given taking as an example the F13-type optical fiber connector adapter according to JIS-C-5982. However, the present invention is commonly applicable to optical connector adapters each formed by coupling adapter halves together.

Various exemplary embodiments of this invention will be enumerated in the following items 1-8.

1. An optical connector adapter (10) for use in connecting a first and a second optical connector plug (1, 2) to each other, comprising:
 a first adapter half (11); and
 a second adapter half (12) which is butted against the first adapter half in a predetermined direction (D1),
 wherein the first and second adapter halves have engaging means (21, 22, 32, 33, 21', 22', 32', 33') for maintaining the first and second adapter halves in a butted state thereof in the predetermined direction, and
 the engaging means is configured to be disposed inside the optical connector adapter and to be prevented from releasing engagement thereof by at least one of the first and second optical connector plugs.

The optical connector adapter according to the item 1 has an advantage in that the number of components is small, the assembly is easy, and further, damage or malfunction of engaging means between the components can be prevented, thus being durable.

2. The optical connector adapter according to item 1, wherein the first adapter half comprises a body portion (14) defining a first fitting hole (13) for receiving the first optical connector plug and a tubular portion (15) projecting from the body portion in the predetermined direction, the tubular portion defines a second fitting hole (16) for receiving the second optical connector plug, the second adapter half defines a mounting hole (31) receiving the tubular portion, and the engaging means comprises a first engaging portion (21, 22) formed on an outer surface of the tubular portion and a second engaging portion (32, 33) formed on an inner surface of the mounting hole and engaged with the first engaging portion in the predetermined direction.

3. The optical connector adapter according to item 2, wherein the first and second adapter halves are coupled together by butting the first adapter half against the second adapter half in the predetermined direction in a state where the tubular portion is inserted into the mounting hole, and engaging the first engaging portion with the second engaging portion.

4. The optical connector adapter according to item 2, wherein the first engaging portion is in the form of a convex or concave portion, and the second engaging portion is in the form of a concave or convex portion.

5. The optical connector adapter according to item 2, wherein the tubular portion is formed with a plurality of cut grooves (23) each extending in the predetermined direction to thereby provide an elastically deformable wall portion (15a, 15b) between the cut grooves, and the first engaging portion is provided on the wall portion.

6. The optical connector adapter according to item 2, wherein the tubular portion is formed with a plurality of cut grooves (23) each extending in the predetermined direction to thereby provide a cantilever locking piece (24) between the cut grooves, and the locking piece is adapted to engage with the second optical connector plug received in the second fitting hole.

7. The optical connector adapter according to item 6, wherein the first engaging portion is formed at each of a plurality of positions spaced apart from each other in a circumferential direction of the tubular portion, and the locking piece is formed between the plural positions in the circumferential direction of the tubular portion.

8. The optical connector adapter according to item 1, wherein each of the first and second adapter halves is integrally formed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical connector adapter for use in connecting a first and a second optical connector plug to each other, comprising:
 a first adapter half; and
 a second adapter half which is butted against the first adapter half in a predetermined direction, wherein the first and second adapter halves have engaging means for maintaining the first and second adapter halves in a butted state thereof in the predetermined direction, wherein the engaging means is configured to be disposed inside the optical connector adapter and to be prevented from releasing engagement thereof by at least one of the first and second optical connector plugs, wherein the first adapter half comprises a body portion defining a first fitting hole for receiving the first optical connector plug and a tubular portion projecting from the body portion in the predetermined direction, wherein the tubular portion defines a second fitting hole for receiving the second optical connector plug, wherein the second adapter half defines a mounting hole receiving the tubular portion, and wherein the engaging means comprises a first engaging portion formed on an outer surface of the tubular portion and a second engaging portion formed on an inner surface of the mounting hole and engaged with the first engaging portion in the predetermined direction.

2. The optical connector adapter according to claim 1, wherein the first and second adapter halves are coupled together by butting the first adapter half against the second adapter half in the predetermined direction in a state where the tubular portion is inserted into the mounting hole, and engaging the first engaging portion with the second engaging portion.

3. The optical connector adapter according to claim 1, wherein the first engaging portion is in the form of a convex or concave portion and the second engaging portion is in the form of a concave or convex portion.

4. The optical connector adapter according to claim 1, wherein the tubular portion is formed with a plurality of cut grooves each extending in the predetermined direction to thereby provide an elastically deformable wall portion between the cut grooves, and the first engaging portion is provided on the wall portion.

5. The optical connector adapter according to claim 1, wherein the tubular portion is formed with a plurality of cut grooves each extending in the predetermined direction to thereby provide a cantilever locking piece between the cut grooves, and the locking piece is adapted to engage with the second optical connector plug received in the second fitting hole.

6. The optical connector adapter according to claim 5, wherein the first engaging portion is formed at each of a plurality of positions spaced apart from each other in a circumferential direction of the tubular portion, and the locking piece is formed between the plural positions in the circumferential direction of the tubular portion.

7. The optical connector adapter according to claim 1, wherein each of the first and second adapter halves is integrally formed.

* * * * *